W. P. Downer.
Refining Oils.
No 44,519. Patented Oct. 4, 1864.
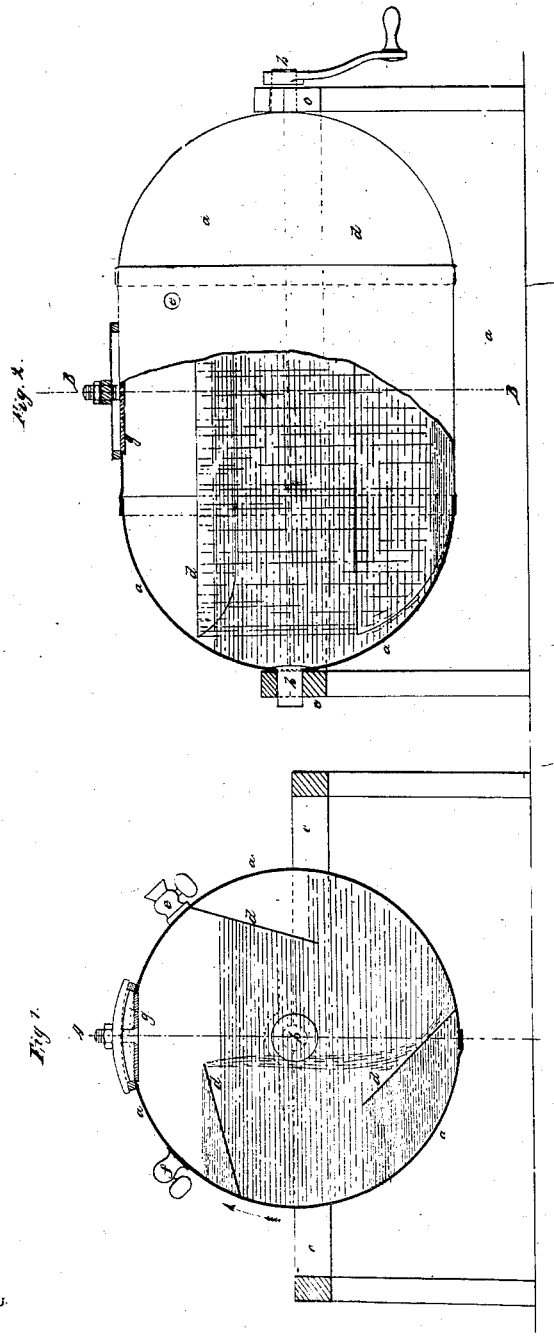
Witnesses.
Inventor.
William Perlee Downer

UNITED STATES PATENT OFFICE.

WILLIAM PORTER DOWNER, OF NEW YORK, N. Y.

REFINING PETROLEUM AND OTHER OILS

Specification forming part of Letters Patent No. 44,519, dated October 4, 1864.

*To all whom it may concern:*

Be it known that I, WILLIAM PORTER DOWNER, of the city, county, and State of New York, have invented a new and Improved Method of Refining Petroleum and other Oleaginous Products; and I do hereby declare that the following is a full and exact description thereof, reference being had to the accompanying drawings, and to the letters and figures of reference marked thereon.

The nature of my invention consists in providing an oviform cylindrical rotating washer of any workable capacity, of metal or of any other suitable material or combination of materials, with bearings arranged longitudinally with the center of said vessel. Internally this vessel is provided with three or more inclined vanes (of metal or other suitable material) which are riveted or otherwise securely fastened to the inner case. Externally the said vessel is provided with two stop-cocks—one for the introduction and discharge of the petroleum or other substance to be refined, and the other for the escape and ingress of air—and also with a man-hole for the purpose of inspecting, cleaning, or repairing the said washer.

In order that my invention may be better understood, and that others may be enabled to make and use the same, I will proceed to explain its construction and operation.

The two figures in the accompanying drawings represent longitudinal and cross sections of my invention.

$a\ a$ is the cylindrical vessel. $b\ b$ are the trunnions it revolves upon; $s\ s$, the framing in which such trunnions run; $d\ d\ d$, the inclined vanes; $e$, the funnel-cock for introducing and discharging the substance to be refined; $f$, the air-cock for discharging and introducing the air, and $g$ the man-hole for inspecting, cleansing, or repairing the interior.

The operation of my invention is effected in the following manner: The vessel $a$ is rotated until the funnel-cock $e$ presents itself uppermost, the air-cock being then opened and the man-hole closed. The substance to be refined is introduced to about the level indicated in the drawings, and immediately afterward a due proportion of sulphuric acid, (such amount as is always understood to be sufficient by persons skilled in the art of refining oils.) I then close both cocks and rotate the washer, either by hand or other motive power, until the process of refining is complete. I then turn the said washer into position with the funnel-cock $e$ level with the liquid within, then open both cocks, and rotate the vessel slowly in a direction opposite to the course of the arrow, keeping the opening of the cock $e$ constantly below the level of the contents of the vessel, until the oil and refuse have been discharged, when the vessel will be ready for a second charge. When artificial heat is required to activate the refining process, I make the trunnions $b\ b$ hollow, and connect them through the washer by means of a metallic pipe, into which I introduce steam.

Three important results are obtained by my invention: first, raising the whole of the acid from the bottom of the vessel, to which its superior gravity had carried it, and pouring it on the surface of the oil, which is effected by the rotation of each vane; secondly, the agitation of oil and sulphuric acid produced by the escape of air in said liquids, which air is brought in considerable quantity below the surface by the return of the empty vanes; thirdly, by the internal surface of the vessel being alternately washed by the oil and the acid.

What I claim as my invention, and desire to secure by Letters Patent, is—

1. The use of a rotary hermetically-closed vessel for mixing petroleum and other oils with acids.

2. The use of vanes so placed inside of said vessel, in manner as shown, that by their rotation they first elevate the heavier liquid from the bottom to the top of the lighter liquid, and then, when empty, by continuing their rotation, carry with them below the surface of such liquids a body of air which, by escaping, maintains the desired agitation.

WILLIAM PORTER DOWNER.

Witnesses:
  WM. H. MCGEE,
  W. E. SLOCUM.